INVENTOR
GEORGE G. GORBATENKO

BY Sughrue, Rothwell, Mion, Zinn & Macpeak
ATTORNEYS

United States Patent Office 3,492,470

Patented Jan. 27, 1970

3,492,470

REACTIVE ANALOG CORRELATOR

George G. Gorbatenko, Rochester, Minn., assignor to International Business Machines Corporation, Armonk, N.Y., a corporation of New York Filed Nov. 24, 1967, Ser. No. 685,427
Int. Cl. G06g 7/19; G06f 15/34; G06k 19/00
U.S. Cl. 235—181 10 Claims

ABSTRACT OF THE DISCLOSURE

The analog correlator uses a capacitor storage array and the word lines of the array to weight the sense lines with desired values. The algebraic sum of the driving voltages is zero and selected ones of the drive lines are coupled to a given sense line by capacitors at the crossing points. A binary input word controls the closure of switches which connect the sense lines to a summation amplifier to perform the summation $$\sum_{i=1}^{n} u_i w_{ij}$$

where $u_i$ represents the $i$th bit of the input word and $w_{ij}$ represents the weight coupled to the $i$th sense line by the $j$th group of energized drive lines. Each group of drive lines corresponds to a different stored reference. With the drive lines driven sequentially correlation of the input word and the stored references is performed sequentially.

BACKGROUND OF THE INVENTION

The invention is in the field of analog correlators and specifically is a correlator which uses a read only storage reactive array for mechanizing the summation.

$$\sum_{i=1}^{n} u_i w_{ij}$$

The summation will be recognized as the correlation of an input vector (word) with a stored matrix (plurality of stored words), where:

$u_i$ is the $i$th bit of the input vector,
$w_{ij}$ is the $i$th weight of the $j$th stored reference.

This type of correlation can be better visualized by the following oversimplification: A single input word representing an unknown is "compared" with many reference words to see if it belongs in any of the reference categories.

The uses of correlators which perform the above identified summation are in the art of character and pattern recognition, speech recognition devices, and other information extraction applications which can be couched in terms of the above summation.

An example of the use of correlators in a character recognition system is described herein to provide a better understanding of the purpose of correlators. Assume multiple tests, say 120, are devised for the identification of written characters. If the letter A is then subjected to these tests it results in some tests coming up and some not coming up (corresponding to satisfaction and nonsatisfaction of a test). With many forms of the letter A tested in this manner the frequency at which a given test comes up is noted. Thus for each test 1–120 we can assign a weight, $w_{1-120}$, to it which represents the importance of that test to the letter A, or stated otherwise, represents the probability of the test coming up when a letter A is tested. Now if tests are performed on an unknown letter we can tell if the letter is an A by adding all the weights of the A reference for those tests which come up. A threshold summation indicates that the letter is an A. All the other letters can be stored in the same manner and the tests on the unknown can be "compared" with the references.

Each stored reference is referred to as a reference, plane, reference plane, or weighted plane. The combination of test results in the input word or input vector. It should be noted that the present invention is not concerned with the selection of the weights of the reference planes nor the setting of the threshold for each reference. These are determined by the user of the correlator depending upon his specific intended use. However, in one embodiment of the invention the threshold T (more commonly referred to as the tare weight), is subtracted from the sum of the weights so that all references may be identified by using a zero threshold detector, i.e. the input vector is said to be normal to the $j$th plane when the following expression is satisfied:

$$\sum_{i=1}^{n} u_i w_{ij} - T_j \geq 0$$

A discussion of the use of a device which implements the above expression in a character recognition environment is given in Tunis et al., "Spectrum" July 1967, page 72.

One method of implementing the correlation expression above is by programming a digital computer to evaluate the expression. However this is very costly in terms of time and of the amount of logic necessary.

Other proposals have been made to use reactive materials to store the analogs of the weights of each plane. One such proposal is described by Nagy in 1966 IEEE International Convention Record, Part 3, Computer, pp. 61–68, "Parallel Matrix Multiplier Using Read-Only Array," Mar. 21–25, 1966. Nagy proposes using a capacitive storage array made from capacitive cards. The input vector drives the bit-drive lines and the output on each word line represents a summation. However, as configured by Nagy, driving the bit lines in a binary fashion severely limits the ability to expand the correlator's function of generating weights other than binary. Also, since in any reactive element matrix there will be stray reactances floating around, errors are likely in the absence of balancing which is not achieved by the Nagy proposal.

Another prior art reactive correlator uses inductive reactances in a matrix and is described in Pick et al., "The Solenoid Array—A New Computer Element," IEEE Transaction on Electronic Computer, pp. 27–35, February 1964. In accordance with this scheme, the bits of the input vector drive groups of balanced and weighted solenoids. Each reference plane is implemented by a separate physical plane of printed loops which selectively encircle the solenoids in accordance witht he predetermined weights of the reference plane. However, even though the solenoids in any one group are balanced, stray reactances are not balanced out because a solenoid of an unenergized group will see a portion of the return flux from a solenoid of an adjacent energized group.

SUMMARY OF THE INVENTION

In accordance with the present invention the weights are effectively stored in a reactive matrix by a group of weighted drive lines reactively coupled to crossing sense lines. The sense lines are switched into a summation means under control of the input vector. Each group of drive lines effectively places the weights of a single corresponding reference plane onto the sense lines. Since the drive lines are balanced to zero and since they are energized independently of the input vector, strays are cancelled out.

DETAILED DESCRIPTION OF THE INVENTION

Figure 1:
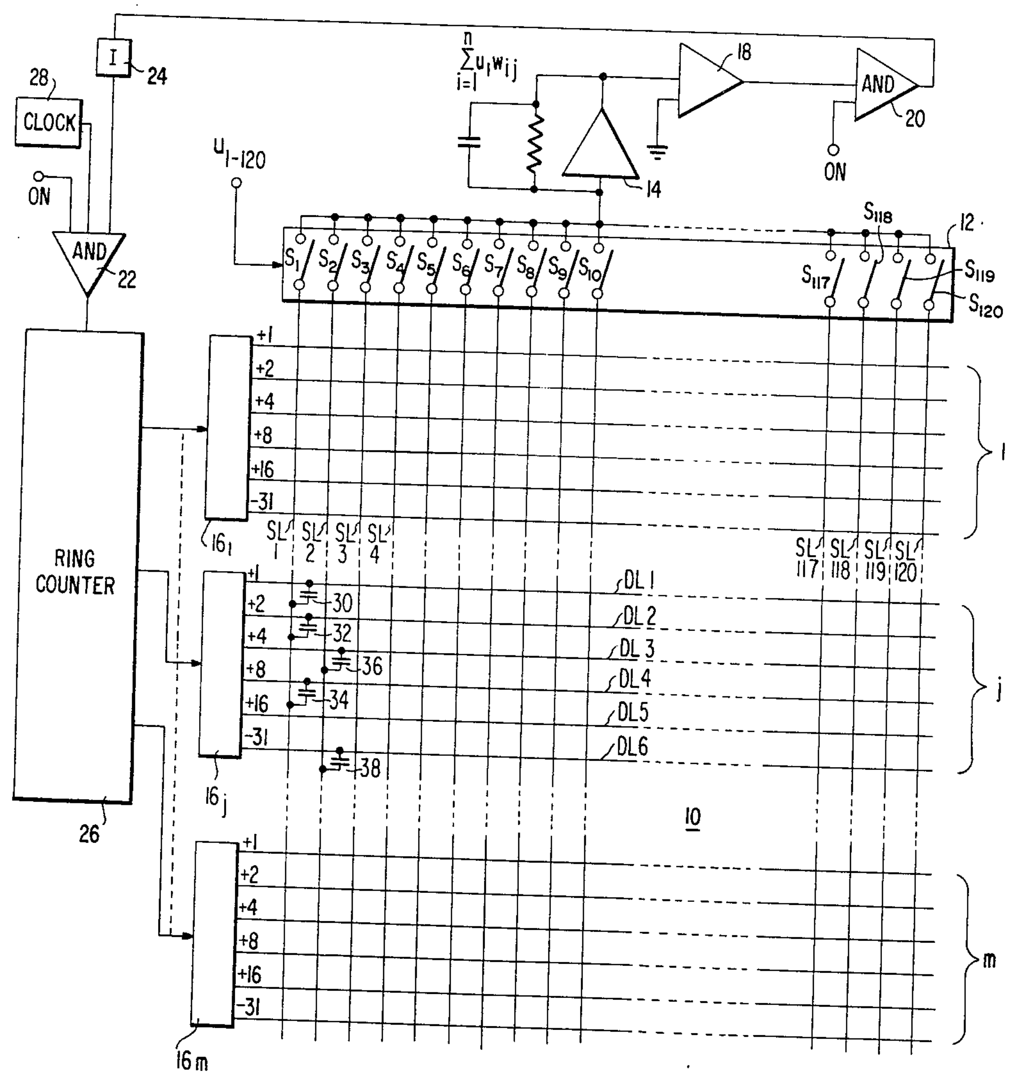
FIGURE 1 is a partial schematic diagram of a preferred embodiment of the present invention together with functional units for carrying out one type of use of the present invention.

The correlator of FIGURE 1 includes a capacitive matrix 10, a bank of switches 12, a summation amplifier 14, and voltage dividers 16*j*, where *j* is *l* through *m*. The remaining elements in the drawings are included only for the purpose of illustrating the sequential functioning of the correlator. The other elements are a zero threshold detector 18, two AND gates 20 and 22, an INVERT gate 24, a ring counter 26 and a source of clock pulses 28.

The capacitive array is the same structurally as a capacitive read-only storage device in that it includes horizontal lines orthogonally positioned with respect to vertical lines, and capacitors coupling horizontal lines to vertical lines at preselected locations. In the present invention the charges of the capacitors are weighted by connecting them to selected word (horizontal) lines such that the net charge per any bit (vertical) line will represent the desired stored weight $w_{ij}$ for the correlator. In order to provide a wide range of weights a plurality of horizontal or drive lines are used to effectively generate a net weight on one sense line. This can best be understood by considering a specific example. Each voltage weighting divider 16 controls the voltages on six drive lines which make up one group of drive lines. Each group of drive lines serves one reference plane *j*. The number of reference planes is irrelevant to the present invention. Assuming the use of the invention in a letter recognition environment, 26 planes could be used corresponding to the 26 letters of the alphabet.

All capacitive coupling elements in the array have a value of about 1 pf. and couple a charge into the sense line depending upon the voltage in the drive line. With only voltage divider 16$_j$ energized the drive lines DL 1 through DL 6 of the *j* plane have values of +1, +2, +4, +8, +16, and −31 respectively thereby allowing each stored weight $w_{ij}$ to have any integral value from +31 to −31 thereby providing a wide range of weights and satisfying the resolution requirements of an analog correlator. Specifically, capacitors 30, 32 and 34 have voltages of +1, +2 and +8 respectively, applied thereto. When sense line switch S1 is closed currents flow through these capacitors dependent upon the voltage to which they are connected. Current continues to flow until the voltages across the capacitors are equal to the voltages to which they are respectively connected. Thus, the charge coupled through a capacitor is proportional to the voltage applied thereto. Therefore, when sense line switch S1 is closed a charge having a total weight, $w_{1j}$ of +1 is coupled into sense line SL1. In a similar manner, capacitors 36 and 38 couple a charge into sense line SL2 having a total weight, $w_{2j}$, of −27. The remaining capacitors in the array are not shown since the coupling into two sense lines is sufficient to explain the manner in which weights are represented in the array.

The sense line switches S1–S120 which are indicated for the purpose of simplicity as mechanical switches are preferably transistor switches controlled by the input vector $u_{1-120}$. In the example shown here in the input vector is a binary word of 120 bit width. Each bit $u_i$ controls the corresponding switch $s_i$. The particular transistor circuitry for controlling 120 switches in response to a 120 bit parallel input word would be obvious to anyone of ordinary skill in the art and therefore is not described in detail herein.

With the drive lines of the *j* plane energized and the switches $s_1$–$s_{120}$ controlled by the input vector $u_{1-120}$ the summation amplifier will provide an output proportional to $$\sum_{i=1}^{120} u_i w_{ij}$$

Thus a correlation or "comparison" of the input vector with the reference in the *j* plane is accomplished. It will be noted that when the *j* plane is energized only the weights stored therein will be coupled into sense lines S1–S120. This is because the voltage dividers are energized one at a time. The input vector is correlated or "compared" with all of the reference planes by sequentially energizing the voltage dividers 16 through 16$_m$.

If it is only desired to determine which reference plane is the most closely associated with the input vector the output summations resulting from the energization of the different planes could be stored, the energized plane resulting in the maximum amplitude output being the most closely related to the unknown input vector.

More likely the use of the correlator in schemes such as pattern recognition would require the addition of thresholds or tare weights, $T_j$, for each reference, i.e the input vector is "normal" to the *j* plane $$\sum_{i=1}^{n} u_i w_{ij} - T_j \geq 0$$

As stated above, the values of the tare weights are a matter for the user of the correlator to determine. However, in the present invention all tare weights for the different planes can be accommodated in the array itself thus allowing a single threshold amplifier for multiple planes having different tare weights.

With the matrix shown in FIGURE 1, a group of sense lines may be easily weighted to provide the tare weights for each plane. Assuming the sense lines $SL_{117}$–$SL_{120}$ are used to provide tare weights (in which case switches $S_{117}$, $S_{118}$, $S_{119}$ and $S_{120}$ are closed), the system allows values of tare weights from −124(4×−31) to +124(4×+31). Used in this manner the output of the summation amplifier can be described as $$\sum_{i=1}^{n} u_i w_{ij} - T_j$$

Thus, instead of providing separate sense amplifiers to detect when the summation for each plane goes above the threshold for that plane, all summations may be applied to a zero threshold level detector such as shown by 18 in FIGURE 1. A simple method of using the output of the zero threshold detector for determining which of the planes is "normal" to the input vector is illustrated in FIGURE 1. A source of clock pulses from source 28 drives a ring counter 26 when the system is ON. The ring counter sequentially energizes the voltage dividers 16. When the output of summation amplifier 41 goes above zero the output of zero threshold detector 18 becomes positive causing the AND 20–INVERT 24 combination to block clock pulses from sequencing the ring counter 26. The last plane energized is the one "normal" to the input vector.

Figure 2:
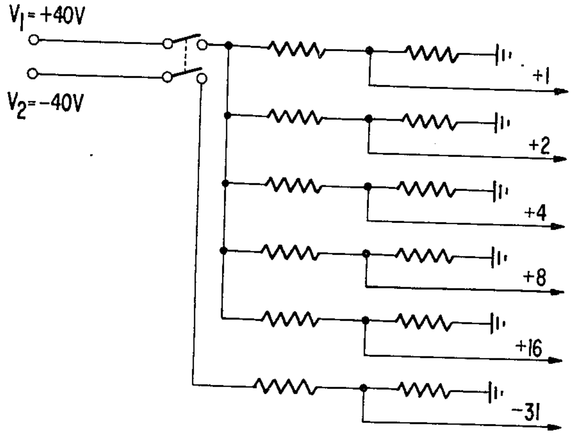
FIGURE 2 is a schematic diagram of a voltage divider useful in the preferred embodiment of FIGURE 1.

An example of the voltage divider 16 is illustrated in FIGURE 2. In this example a separate pair of resistors provides each voltage output, and the connection of the voltages $V_1$ and $V_2$ to the voltage divider is controlled by the ring counter. It should be noted that in an inductance matrix which is constructed to be analogous to the capacitive matrix correlator described herein, weighted currents rather than voltages would be used.

As stated previously, the problem with reactive element matrices in a correlator is that there are stray reactances which cause erroneous weights to be coupled into the sense lines. The problem is overcome in the present invention by using balanced drive lines which are driven independently of the input vector. The drive lines of any one group provide a total voltage of zero and since the stray capacitance between all drive lines and sense lines is the same the charge coupled into a sense line by stray capacitances balances out to zero. It will be apparent that the feature of energizing the drive lines independently of the input vector and switching the sense lines in dependence upon the input vector is a significant feature in the attainment of balance. If the drive lines were driven in dependence upon the input vector, as proposed in the prior art, there would not be balancing out of stray reactances except in the unlikely case when the input vector drives all drive lines simultaneously.

One of the features that makes the invention very attractive to systems designers is that the technology of capacitive arrays is advanced to the stage which allows them to be manufactured very cheaply and which allows fast and easy substitution of capacitors in the array. In the correlator the latter features allow fast and easy substitution of new reference planes. In a preferred construction of the present invention the capacitive array is a CCROS (capacitive card read only store) which is well known in the art and described by J. W. Haskell in "Design of a Printed Card Capacitor Read-Only Store," I.B.M. Journal, March 1966 p. 142+. To use the CCROS array in the construction of the present invention, the bit lines of the CCROS are used as the sense lines of the correlator and connected through switches to a summation amplifier. The word lines of the CCROS are used as the drive lines of the correlator and each group of six drive lines is connected to a voltage-weighted divider. The capacitor cards, having sixty crossovers and thus sixty sense lines in a row, are driven in pairs on the front and back of a storage board so that the array can accommodate an input vector of up to 120 bits. It will be noted that each group of six drive lines (a pair of word lines on the front and back are treated as one drive line) is energized sequentially on the storage board. However, in a multiple board array the boards can be driven simultaneously, i.e. the first six drive lines on each board are energized, then the next six and so on. In this manner a sort of serial-parallel correlation could be achieved with a separate summation amplifier serving each board.

While the invention has been particularly shown and described with reference to a preferred embodiment thereof, it will be understood by those skilled in the art that various changes in form and details may be made therein without departing from the spirit and scope of the invention.

What is claimed is:

1. An analog correlator comprising (a) at least a first group of drive lines, (b) sense lines arranged to form a matrix of crossover points with said first group of drive lines.

(c) a first power supply means, connected to said first group of drive lines, for connecting a first group of weighted signal levels to said first group of drive lines respectively, said group of weighted signal levels having an algebraic sum equal to zero, (d) reactive coupling means coupling said first group of drive lines to said sense lines at selected ones of said crossover points for coupling an electrical quantity into each of said sense lines corresponding to the algebraic sum of the signal levels on said drive lines which are coupled to each of said sense lines, when said first power supply means is energized.

(e) a summation means for summing the inputs applied thereto, and (f) switching means responsive to an input binary vector for connecting any selected group of said sense lines to said summation means.

2. An analog correlator as claimed in claim 1 further comprising (a) additional groups of drive lines forming additional matrices of crossover points with said sense lines.

(b) additional power supply means, one for each group of drive lines, for connecting groups of weighted signal levels to said groups of drive lines, each of said groups of weighted signal levels having an algebriac sum of zero, and (c) reactive coupling means coupling each group of drive lines to said sense lines at selected ones of said crossover points for coupling an electrical quantity into each of said sense lines from each group, when energized, corresponding to the algebraic sum of the signal levels on the drive lines of said last mentioned group which are coupled to said sense line.

3. An analog correlator as claimed in claim 1 wherein said reactive coupling means comprises substantially identical capacitors, each connected between one sense line and one drive line at a selected one of said crossover points.

4. An analog correlator as claimed in claim 2 wherein said reactive coupling means comprises substantially identical capacitors, each connected between one sense line and one drive line at a selected one of said crossover points.

5. An analog correlator as claimed in claim 4 further comprising means for sensing the polarity of the output of said summation means.

6. An analog correlator as claimed in claim 5 wherein said sense lines are printed on a first surface and connected to a printed capacitor bottom plate also printed on said first surface at every crossover point, said drive lines are printed on replaceable cards positioned over and separated from said first surface by a dielectric layer each of said cards having a printed upper capacitor plate at every crossover point, said drive lines being connected to said upper capacitor plates at said selected crossover points.

7. An analog correlator for performing the summation $$\sum_{i=1}^{n} u_i w_{ij} - T_j,$$

where $u_i$ represents the $i$th bit of an input binary vector of length $n$, $w_{ij}$ represents the $i$th weight of the $j$th reference plane, and $T_j$ represents the tare weight for the $j$th reference plane comprising, (a) a plurality of sense lines and drive lines orthogonally positioned to form a matrix of crossover points, (b) first energizing means for energizing a first group of said drive lines to connect selected voltages to each of said drive lines in said group, said selected voltages having an algebraic sum of zero, and said first group of drive lines defining the physical equivalent of a reference plane, (c) reactive coupling means connecting said first group of drive lines to said sense lines at selected crossover points to couple electrical quantities into any given sense line corresponding to the voltages on the energized drive lines which are connected to said given sense line, the crossover points being selected to cause said quantities on $n$ of said sense lines to represent the weights $w_1$ through $w_n$ for the reference plane defined by siad group of drive lines, and also selected to cause the sum of said quantities on plural other sense lines to represent —T for said reference plane, (d) means for summing the electrical quantities applied to an input thereof and (e) means responsive to electrical signals representing said input vector for controlling the connection of said $n$ sense lines in accordance with the binary value of the $n$ bits of said input vector respectively to the input of said summing means and (f) means for coupling said other sense lines to the input of said summing means.

8. An analog correlator as claimed in claim 7 further comprising (a) additional energizing means for energizing additional groups, respectively, of drive lines to connect selected voltages to each drive line in any group, said selected voltages applied to any group having an algebraic sum of zero, and each group defining the physical equivalent of an additional reference plane, and (b) reactive coupling means connecting each of said groups to said sense lines at selected crossover points for coupling, from any energized group of drive lines, quantities into said $n$ sense lines corresponding to weights $w_1$ through $w_n$ for the reference plane defined by said energized group of drive lines and for coupling quantities into said plural other sense lines whose sum represents $-T$ for said latter reference plane.

9. An analog correlator as claimed in claim 8 wherein said reactive coupling means comprises substantially identical capacitors, each connected between one sense line and one drive line at a crossover point.

10. An analog correlator as claimed in claim 9 further comprising means responsive to the summation output of said summing means for detecting when $$\sum_{i=1}^{n} u_i w_{ij} - T_j \geq 0$$

References Cited

UNITED STATES PATENTS

| | | | |
|---|---|---|---|
| 3,275,985 | 9/1966 | Dunn et al. | 340—146.3 |
| 3,397,393 | 8/1968 | Palmateer et al. | 340—173 |

MALCOLM A. MORRISON, Primary Examiner

FELIX D. GRUBER, Assistant Examiner

U.S. Cl. X.R.

235—61, 12; 340—146.3, 166, 173